Aug. 22, 1967

G. B. KEITH ETAL 3,336,942

CHECK VALVE

Filed July 28, 1964

GARLAND B. KEITH
CHARLES A. KEITH
*INVENTOR.*

BY Wilkinson Mawhinney & Theibault

ATTORNEYS 3,336,942
CHECK VALVE
Garland B. Keith and Charles A. Keith, both of 208 Forest Hills Drive, Kingsport, Tenn. 37663
Filed July 28, 1964, Ser. No. 385,733
11 Claims. (Cl. 137—529)

The present invention relates to a check valve.

Several types of automatic check valves are presently in common use in the art of preventing reverse flow of fluids (both liquids and/or gases) in vessels or pipes for transmission of same. Four of the most common types are the stemmed poppet valve, ball check valve (both with and without a spring return), swing check valve, and reed valve.

All such valves operate on the principle of a movable member being pushed by the flowing medium to expose a passage for said medium and a return of the movable member to a sealing seat to prevent backward flow with a spring, gravity or back pressure providing the force to bring the movable member back to its sealing and flow-preventing position. Containing and guiding the movable sealing member is a problem in all types and in a majority of cases is the sole cause of failure of the valve. Poppet stems sliding back and forth wear both stem and guide as well as compression spring, and soon the stemmed poppet will not return squarely to its seat. Hinge points on swinging flaps wear; spherical balls, guides and guided compression springs wear; deflecting reeds trap foreign matter in the nip and fail at the point of maximum stress; and as a result the valves fail.

Additionally, none of these valves are suited for mounting in all attitudes, but for reasons of wear, gravity, etc., such valves perform better in a particular horizontal or vertical mounting depending on the type. Furthermore, the operation of each type is greatly aggravated by abrasive contaminants such as in the common usage of pumping water, where some sand or soil may be present.

A primary object of the present invention is to provide a check valve which operates without sliding contact of parts.

Another object of the invention is to provide a check valve which operates in any attitude.

A further object of the invention is to provide a check valve with a sealing member held to move axially only and always parallel with its seat.

A still further object of the invention is to provide a check valve which permits maximum flow by substantially eliminating gear from the flow path.

Another object of the invention is to provide a check valve which is virtually unaffected by abrasive contaminants.

A further object of the invention is to provide a check valve which is cheaper to manufacture.

With the foregoing and other objects in view, the invention will be more fully described hereinafter, and will be more particularly pointed out in the claims appended hereto.

In the drawings, wherein like symbols refer to like or corresponding parts throughout the several views.

Referring more particularly to the drawings, 10 designates a check valve body having wrenching flats 11 and 12 at opposite external end portions thereof for receiving a wrench for the purpose of rotating the body to incorporate the same into a pipe or flow line. Externally the body will preferably bear an arrow 13 to indicate the direction of flow and the orientation in which the body 10 must be incorporated in the flow line.

Figure 2:
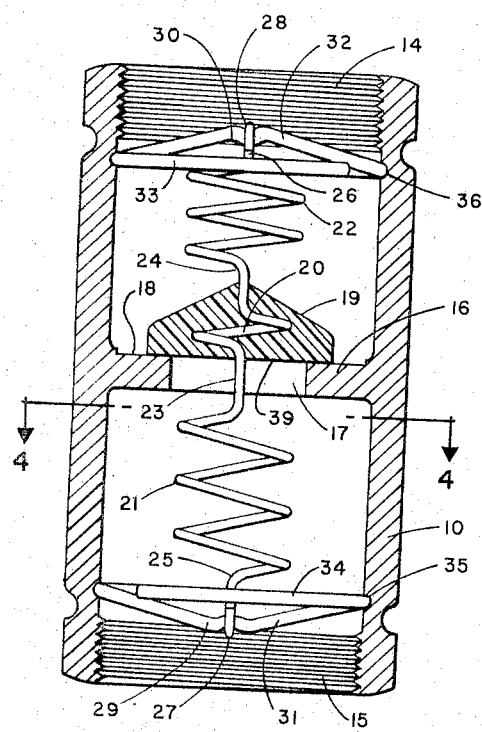
FIGURE 2 is a longitudinal section taken centrally through the body and illustrating the poppet as seated.
Figure 1:
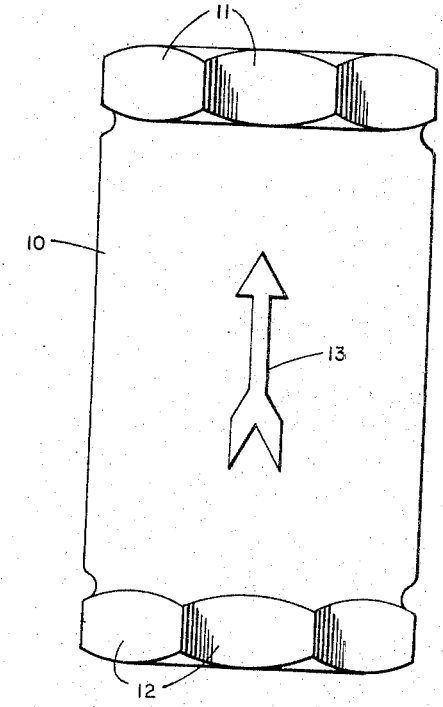
FIGURE 1 is a side elevational view of a valve body constructed in accordance with the present invention, bearing an arrow to indicate direction of flow.

In FIGURE 2 the body is shown as having threads 14 and 15 or some other appropriate coupling means at opposite internal end portions thereof for mating, for instance, with complemental threads on adjoining pipe sections in a flow system.

Internally, at an appropriate location midway or at other desirable point between the ends of the body, such body is molded or otherwise formed with a land or diaphragm 16 having therethrough a port or flow passage 17. At one side this land provides a seat 18 for a poppet 19 which is preferably of a moldable material to permit it to be molded about a reinforcing coil 20 of a coil spring having helices 21 and 22 disposed at opposite sides of the reinforcing coil 20 and connected thereto respectively by shanks 23 and 24. The helix 21 upstream may be characterized as an expansion helix or coil due to the fact that such coil expands incident to the opening movement of the poppet 19; while the helix 22 on the downstream side is characterized by a movement toward shut height incident to such opening movement of the poppet 19 and hence may be said to contract.

Figure 3:
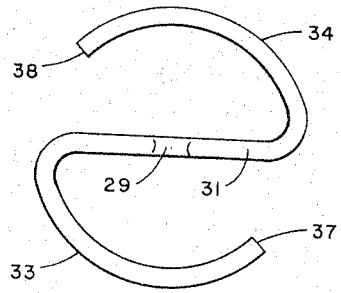
FIGURE 3 is a plan view of a form of snap ring employed.
Figure 4:
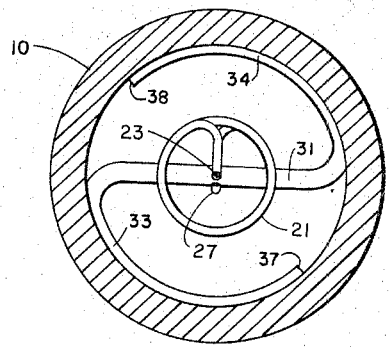
FIGURE 4 is a cross-sectional view taken on the line 4—4 of FIGURE 2 looking in the direction of the arrows.

The outer shanks 25 and 26 of the helices 21 and 22 are overturned or clinched, as indicated at 27 and 28, about central offset bends 29 and 30 of the diametrically arched cross members 31 and 32 forming parts of snap rings shown more particularly in FIGURE 3 as having opposed arcuate sections 33 and 34 joining respectively with opposite ends of the diametric members 31 and 32. These resilient snap rings are adapted in the partially expanded position to occupy circular grooves 35 and 36 made in opposite end portions of the body 10 preferably inwardly of the threaded sections 14 and 15.

As shown in FIGURE 3, the snap rings having diametric arched cross members 31 and 32 are preferably or for convenience substantially S-shaped with free ends 37 and 38 being spaced substantially from the cross members 31 and 32 to permit diametric contraction of the snap rings when introduced into the interior of the body 10 before arriving at the grooves 35 and 36 into which they will snap due to the free diameter of the snap rings being greater than the diameter of the grooves 35 and 36 whereby the snap rings will be forcibly held in place in a stressed condition. The operative face 39 of the poppet 19 is perpendicular to the axial center line of the body 10, and the seat 18 on the land 16 is also finished perpendicularly to such axial center line, the grooves 35 and 36 being substantially concentric with said center line.

It will be noted from FIGURE 2 particularly that the cross members 31 and 32 are arched in relatively opposite directions to better withstand the thrust of the respective helices 21 and 22.

The angular shape of the snap ring members 31 and 32 adjacent the offset bends 29 and 30 facilitates assembly and disassembly, guards against interference in case of over-engagement of connecting pipes and employs the force of the spring helices to hold the snap rings more firmly in the grooves.

The tension spring in effect has three separate helices 20, 21 and 22. Helix 20 serves as a reinforcement of the poppet 19 and fixes the relationship of the poppet to the spring; helix 21 both holds poppet 19 against seat 18 and overcomes force of helix 22 which remains in tension even when poppet 19 is raised from its seat 18. These tension forces in helices 21 and 22 maintain linearity of the tension spring and poppet assembly, holding it always on center line of the body 10.

In operation, viewing FIGURE 2 which shows the closed position of the poppet 19, both helices 21 and 22 are in tension, the upper helix 22 tending to lift the poppet 19 while the lower helix 21, which exerts the greater force, tends to pull the poppet 19 downwardly and seat the same. Consequently, to open the poppet 19 the upwardly moving flow force must exceed the tension force of helix 21 minus that of helix 22. Neither helix is a compression spring.

The two tension helices suspended between hooks 27 28 accordingly tend to hold the poppet on line between the hook points 27 and 28 which are both on the coaxial line of the check valve body 10.

The expected construction would be a compression spring at the point 22 to help seat the valve. However, compression springs produce side force vectors which tend to toggle or push the poppet off sidewise of the axial line to any point except the center line. Such a construction will not work without guides and it is one purpose of the invention to dispense with guides. As an example, assume that helix 22 has a value of ten pounds tension and helix 21 a value of fifteen pounds tension. The resultant is a force which makes poppet 19 tend to move downwardly and rest on seat 18 with a five pound force. The combined flow pressure force and tension force of upper helix 22 will unseat the poppet when such combined forces exceed fifteen pounds, or the value assigned to helix 21. The five pound seating force exerted by the lower helix 21 on poppet 19 to hold the poppet against seat 18 is overcome by the flow pressure force alone.

As the poppet 19 rises from its seat incident to said flow pressure force, the lower helix 21 will be further expanded, while the upper helix 22 will tend to contract or move toward a shut height. However, the arrangement is such that the upper helix 22 will always be in tension tending to pull the poppet upwardly even the normal flow rating of the valve has been greatly exceeded.

As these two tension springs are stretched between two coaxial points, whenever the poppet is off its seat, such poppet is suspended by forces which tend to hold it to a right line path. The helices thus tend to constrain the plug to always move along the axial line so that its lower face is always parallel with the seat 18.

The advantages accruing from this construction are that the valve poppet 19 returns to its seat with flat parallel contact; there are no sliding parts; the valve will operate thusly in any attitude; there is no valve stem, guide or flow obstructing gear, only the thin spring; there is no catch point for abrasive matter and the valve is virtually wearless. The construction is simple and expensive machining is limited to one part rather than three or four. Spring fatigue is the most logical cause for the failure of this valve. Tension spring tests are commonly run for 500,000,000 cycles. Seven tested sliding stem type check valves lasted an average of 3,000,000 cycles each.

The foregoing descriptions are not intended to limit the scope of this invention. The inventors recognize and anticipate variations in construction depending upon the particular use of the valve. For example, male pipe threads could readily be substituted for female; nodes on the wall of the valve body could replace the snap ring locating grooves; a tapered valve seat and poppet could be used instead of a flat seat and poppet; a molded elastic spring and poppet combination member could be employed instead of the metallic spring and poppet as described, or a rigid metallic poppet with an elastic face either bonded on or mechanically retained could be employed; and like or opposite wound spring coils may be employed on the alternately contracting and expanding poppet spring to either cause or prevent a slight spiral movement of the poppet for seat cleaning as desired. Other variations are apparent.

The significance of the member 20 as a spring coil is not too important as the same will be substantially immobilized as a spring coil by the plastic poppet 19 in which it is firmly embedded. In other words any connecting member in the plastic body between the two helices is sufficient.

In assembling, before the terminal end 27 is clinched in the notched offset 29, the lower abutment comprising the parts 31, 33 and 34 is introduced into the lower open end of the body 10 and lodged in place in the groove 35.

The two helices 21 and 22 assembled to the poppet 19 are then lowered into the upper open end of the body 10 with the lower end 25 of the lower helix 21 leading until the poppet 19 strikes and abuts the land 16. The snap ring 32 is sprung into place in groove 36. The lower end 25 of the lower helix 21 is then brought downwardly and its terminal 27 wrapped around the offset 29 and clinched. Helix 21 is now in tension and the poppet is seated. Finally the upper end 26 of the helix 22 is "fished" upwardly, pulling the helix 22 outward to a tension position and the hook 28 is wrapped over the snap ring 32 and clinched.

It will be noted that the shanks 25, 23, 24 and 26 are all in alignment substantially coincident with the axis of the tubular body 10 and that the abutments to which terminals 27 and 28 are firmly affixed will maintain this axial alignment due to the offsets 29 and 30 The arched or bowed form of the diametric bars 31 and 32 impart strength to resist substantial axial displacement.

The whole combination tends to insure right line movement of the poppet and prevents any tilting or canting of the poppet or any radial movement of the poppet which would interfere with complete seating of the poppet throughout the area of its lower face upon the finished seat 18.

The snap rings characterized by the diametric arched bars 31 and 32 thus constitute abutments. While this form of abutment is extremely efficient in the environment described and illustrated, it will be understood that other forms of abutments might be utilized.

Although we have disclosed herein the best form of the invention known to us at this time, we reserve the right to all such modifications and changes as may come within the scope of the following claims.

What is claimed is:
1. A check valve construction comprising
 (a) a hollow body,
 (b) a ported seat in the body,
 (c) a poppet movable to and from the seat, and
 (d) elastic means under tension freely supporting the poppet within the hollow body,
 (e) said elastic means being connected to the upstream side and the downstream side of the poppet for tending to pull the poppet in opposite directions in a substantially straight line motion along the center line of the poppet and the elastic means, and
 (f) said elastic means being in stretched tension and of unequal load values so that the poppet is biased toward the seat.
2. A check valve construction as claimed in claim 1 in which the elastic means comprises
 (g) elastic helices having near ends affixed to the poppet, and
 (h) abutments are provided in the end portions of the body to which outer end portions of the helices are affixed.
3. A check valve construction as claimed in claim 1 further comprising
 (f) open abutments in the body located for anchoring outer end portions of the elastic means.
4. A check valve construction as claimed in claim 3 in which said abutments include
 (g) truss members to which the elastic means is directly connected to adequately resist elastic tension.
5. A check valve construction as claimed in claim 1 in which said elastic means comprises

(f) an element embedded in the poppet.

6. A check valve construction as claimed in claim 2 in which
   (f) the axes of the helices are in line with one another and with the center line of the poppet, and
   (g) the outer end portions of the helices are affixed to the abutments in the same center line.

7. A check valve construction as claimed in claim 3 in which the body has
   (g) internal grooves adjacent end portions thereof, and
   (h) said abutments include snap rings for expanding into the grooves to localize the abutments relatively to the body.

8. A check valve construction as claimed in claim 1 in which the body is
   (e) substantially a straight cylinder,
   (f) said seat being substantially normal to the axis of the cylinder,
   (g) said poppet having a seating surface also substantially normal to the axis of the cylinder and a center line substantially coincident with the axis of the cylinder,
   (h) said elastic means so constructed and arranged and so connected substantially centrally of the poppet that said elastic means constitutes the sole support and guiding means for the poppet in its movements towards and away from its seat so that the poppet is unslidably and frictionlessly guided by said elastic means and the effective force thereof is directed along the cylinder axis to compel poppet movement in opening and closing to maintain its seating surface at all times normal to the cylinder axis and in constant parallelism to the ported seat.

9. A check valve construction as claimed in claim 8 in which the elastic means comprises
   (i) tensionally resilient helices having axes coincident with the cylinder axis.

10. A check valve construction comprising
    (a) a hollow body,
    (b) a ported valve seat in the body,
    (c) a poppet movable in a right line to and from the seat,
    (d) elastic helices having near ends affixed to the poppet,
    (e) abutments in the end portions of the body to which outer end portions of the helices are affixed and comprising
    (f) bowed diametric members having notched arched center off-sets to fixedly receive the outer end portions of the helices,
    (g) the axes of the helices being in line with one another and with the center line of the poppet, and
    (h) the outer end portions of the helices being affixed to the abutments in the same center line.

11. A check valve construction as claimed in claim 10 further comprising
    (i) a center helix embedded in the poppet and being in common formation with the first-named helices.

References Cited

UNITED STATES PATENTS

| | | | |
|---|---|---|---|
| 568,362 | 9/1896 | MacSpadden | 137—535 X |
| 1,089,156 | 3/1914 | Richardson | 137—537 X |
| 1,798,536 | 3/1931 | Hofmann | 137—529 X |
| 1,948,676 | 2/1934 | Riek | 137—543.21 |
| 2,553,248 | 5/1951 | Graham | 267—1 |

FOREIGN PATENTS 500,420  2/1939  Great Britain.

WILLIAM F. O'DEA, *Primary Examiner.*

ALAN COHAN, *Examiner.*

D. H. LAMBERT, *Assistant Examiner.*